United States Patent [19]

Di Rosa

[11] Patent Number: 4,800,249

[45] Date of Patent: Jan. 24, 1989

[54] AUTOMATIC SYSTEM FOR ASSEMBLY AND WELDING METAL SHEET BODIES, PARTICULARLY CAR BODIES, SUITABLE FOR HIGH MASS PRODUCTION

[75] Inventor: Gaetano Di Rosa, Pino Torinese, Italy

[73] Assignee: Fata European Group S.p.A., Pianezza, Italy

[21] Appl. No.: 86,214

[22] Filed: Aug. 13, 1987

Related U.S. Application Data

[63] Continuation of Ser. No. 750,992, Jul. 2, 1985, abandoned, which is a continuation of Ser. No. 716,032, Mar. 26, 1985, abandoned.

[30] Foreign Application Priority Data

Mar. 26, 1984 [IT] Italy .................................. 20226 A/84

[51] Int. Cl.⁴ ............................................... B23K 37/02
[52] U.S. Cl. ........................................... 219/79; 219/80
[58] Field of Search ..................... 219/79, 80; 220/41, 220/45, 47; 29/429, 430

[56] References Cited

U.S. PATENT DOCUMENTS

| | | | |
|---|---|---|---|
| 4,256,947 | 3/1981 | Di Candia | 219/79 |
| 4,483,476 | 1/1984 | Fujikawa et al. | 219/80 A |
| 4,494,687 | 1/1985 | Rossi | 219/80 X |
| 4,659,895 | 4/1987 | Di Rosa | 219/79 |

OTHER PUBLICATIONS

Transporti; Meccanici, V. Zignoli, pp. 525–528, no date listed.

*Primary Examiner*—E. A. Goldberg
*Assistant Examiner*—Teresa J. Walberg
*Attorney, Agent, or Firm*—Toren, McGeady & Associates

[57] ABSTRACT

An automatic system for the production of metal sheet bodies, preferably car metal bodies, which is composed of a plurality of forming-welding assemblies contained in stores so that they can be preselected and carried each in correspondence with an assembly station where the body components are fed, handled and assembled by means of welding through the intervention of a pair of such assemblies respectively positioned on opposite sides of the body.

8 Claims, 14 Drawing Sheets

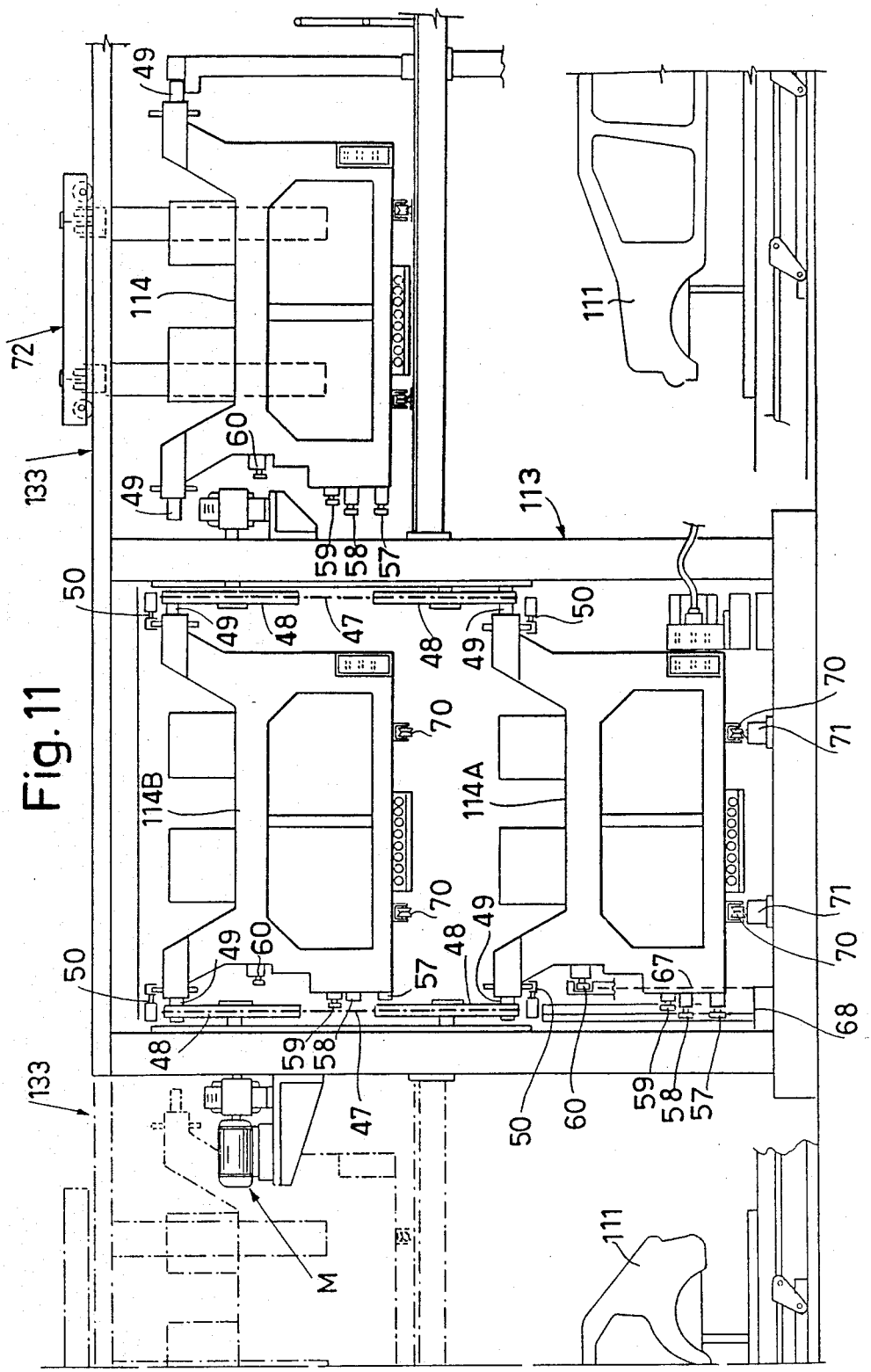

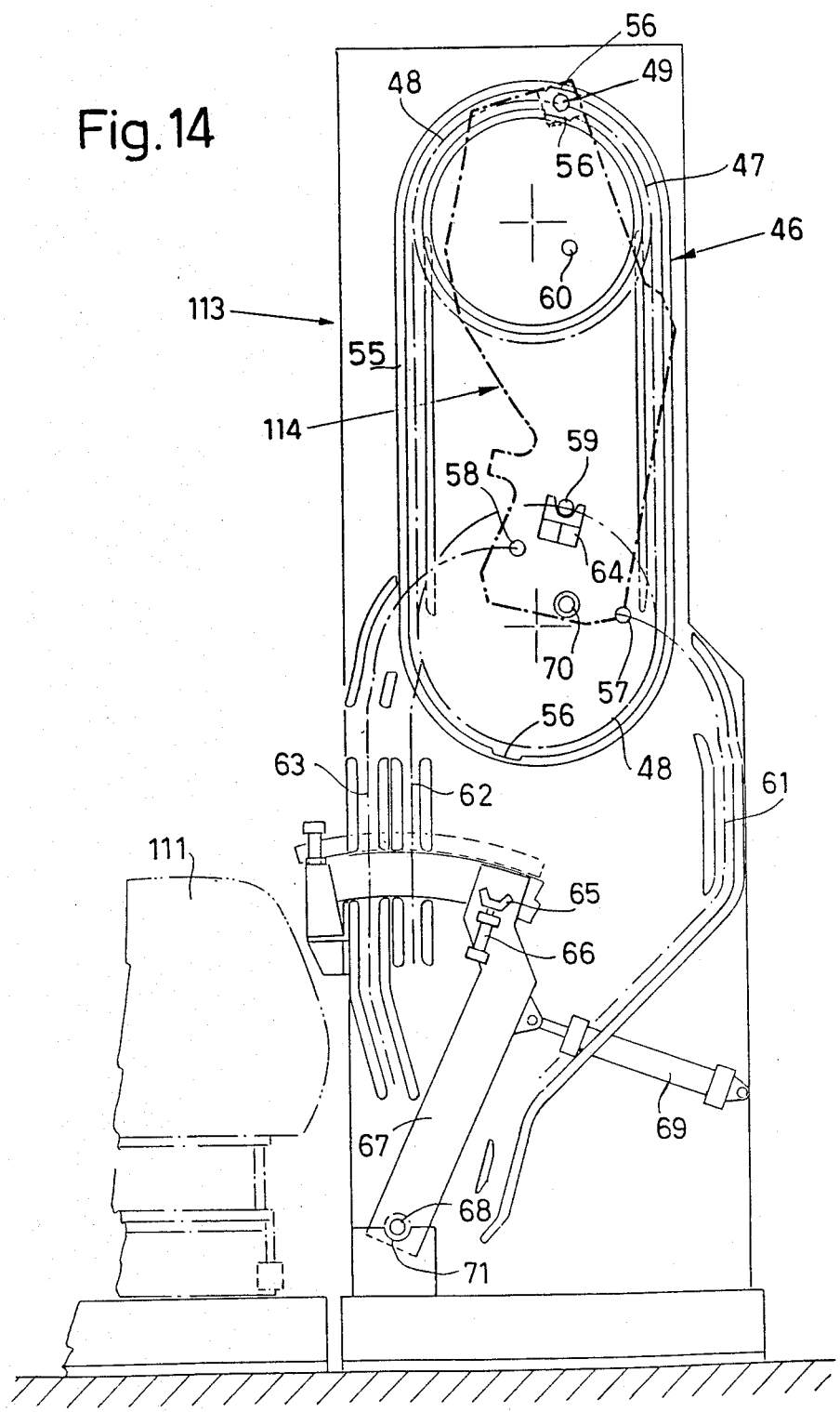

AUTOMATIC SYSTEM FOR ASSEMBLY AND WELDING METAL SHEET BODIES, PARTICULARLY CAR BODIES, SUITABLE FOR HIGH MASS PRODUCTION

This is a continuation of application Ser. No. 750,992, filed July 2, 1985 which is a continuation of application Ser. No. 716,032 filed Mar. 26, 1985 both now abandoned.

BACKGROUND OF THE INVENTION

1. Field of the Invention

The present invention relates to an automatic system for assembling and welding different models of car bodies, and is suitable for high mass production.

The system of the invention is not only suitable for manufacturing such bodies, but is also suitable for manufacturing other types of metal sheet articles different from car bodies.

2. Description of Related Art

Systems for manufacturing car bodies are already known, and they provide a single station including power forming machines and welding machines, this station being a point of confluence for the various components arriving by means of conveying systems, generally of the overhead type.

Such systems have, however, restricted application, since they are capable of obtaining only one basic type of product with few changes.

Flexibility (i.e. the possibility to work on a number of basic types during the same activity period) is in fact obtainable by said first approach only if there is a number of fixed stations comprised of power forming machines and welding machines gang-arranged, involving high costs and large dimensions.

Also systems with carousel line on-floor are known, which systems include in lieu of a single station, an assembly carousel continuously moving and comprised of a plurality of carriages spaced apart along the carousel, each carriage including fixtures for supporting the chassis or the bottom of the car body to which are automatically coupled lateral forming machines for the body sides carried by a "parallel" overhead conveying system which is synchronized with the carousel.

This second type of system is a flexible one, since it permits work on different types of car bodies because the lateral forming machines can be of different types and stored at the head of the line without interference with the production process. This system exhibits, however, some limitations because its welding equipment is generally manual since it is susceptible only with difficulties to be automated by means of robots and since the number of the necessary forming machines is very high.

Also, automatic working systems with multiple welding machines provided with welding yokes on board of the forming machines have been proposed, but such systems do not use robots. With such a system, the welding operations are already automated but production flexibility is completely missing in a single production unit. As in the first approach, in order to obtain flexibility a plurality of ganged units is necessary, with the ensuing disadvantages as mentioned above. On the other hand, if only a single unit is present, long periods of time are necessary to replace any specific fixture.

In the Italian patent application No. 67563 A/77, there is disclosed a single fixed working station in which lateral forming machines movable in longitudinal direction are operating, in order to work on different types of car bodies. Welding systems are provided, according to this type of device, on board of said station. As pointed out above, this latter device is different from the other above cited approaches in that it permits, in addition to the flexibility characteristic, tack-welding in a fixed position and automatically by means of robots.

However, even this latter device has some drawbacks which are of not insiginificant from a practical point of view, because it presupposes, on the one hand, the availability of some area for accumulation of the forming machines, which area is not always available in the plant, and, on the other hand, it compels formation of stations for waiting only and thus not necessary for the production process.

Other systems for assembly and welding operations on car bodies are disclosed for example in our Italian patent applications No. 23102 A/82, 22376 A/83, 22377 A/83 and 22575 B/83, in the name of the same Applicant.

SUMMARY OF THE INVENTION

The general object of the present invention is to provide an automatic system for performing assembly and welding operations on car bodies which combines the advantages of the known systems yet eliminating their drawbacks.

To this end, according to the present invention, there is provided an automatic system for processing metal sheet bodies, preferably metal car bodies, characterized in that it is comprised of a plurality of forming-welding assemblies contained in stores placed alongside a single body-processing station, conveying means being provided for feeding pairs of said assemblies from the stores to the processing station and viceversa, and positioning means being provided in said station for positioning each pair of said forming-welding assemblies in a correct operative position alongside said body and in engagement with electric, hydraulic and pneumatic users for operating welding and auxiliary equipment provided on each assembly.

BRIEF DESCRIPTION OF THE DRAWINGS

The advantages and characteristics of the invention will appear more clearly from the following description taken together with the accompanying schematic drawings which show examples of systems according to the principles of the invention. In the drawings:

FIG. 11 is a longitudinal view of the system, similar to FIG. 3;

FIGS. 14 and 16 show the various significant positions which each forming-welding assembly can take on the path from the store to the operating station and vice versa.

DESCRIPTION OF THE PREFERRED EMBODIMENT

Figure 1:
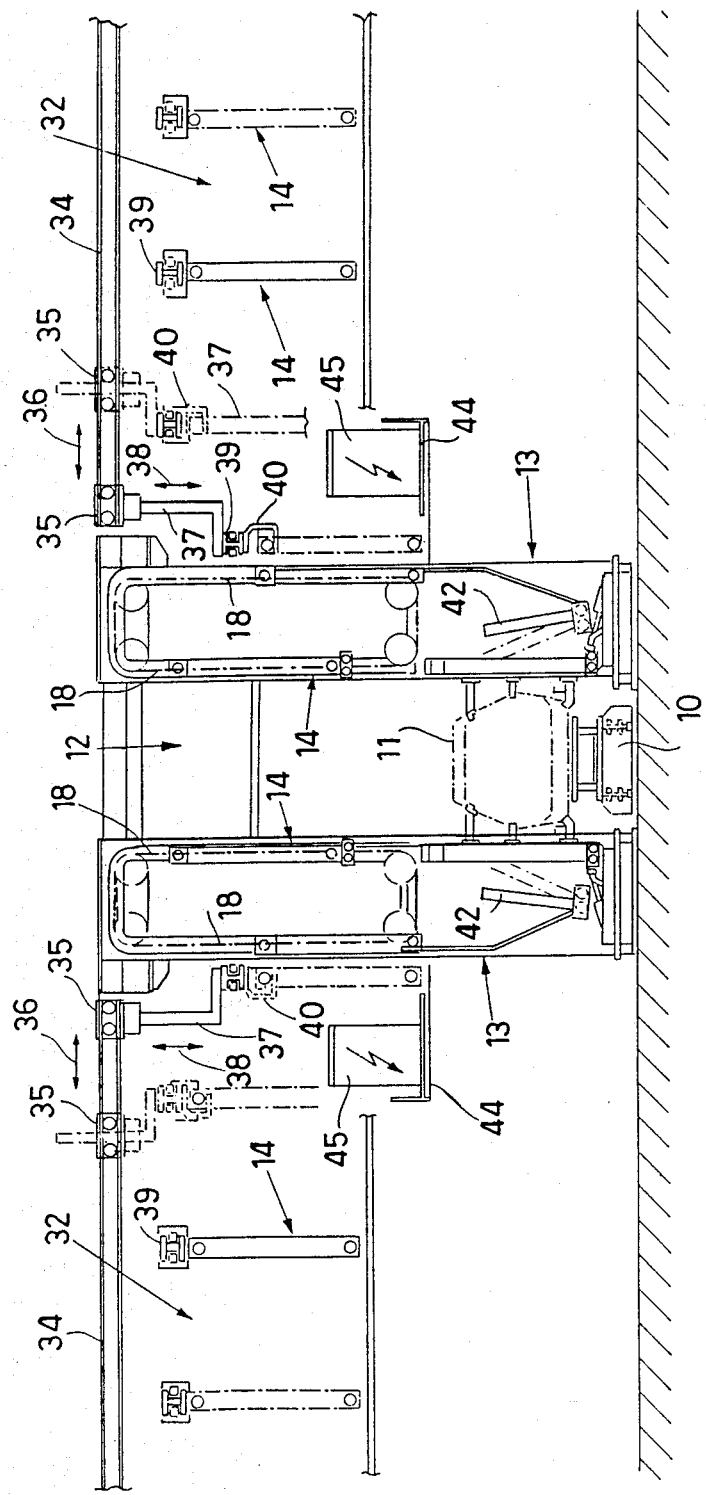
FIG. 1 shows a transverse cross-section of a system according to the invention suitable for the assembly and welding operations on the car body, in correspondence with the single working station of the system, showing both said station and the additional overhead stores.
Figure 2:
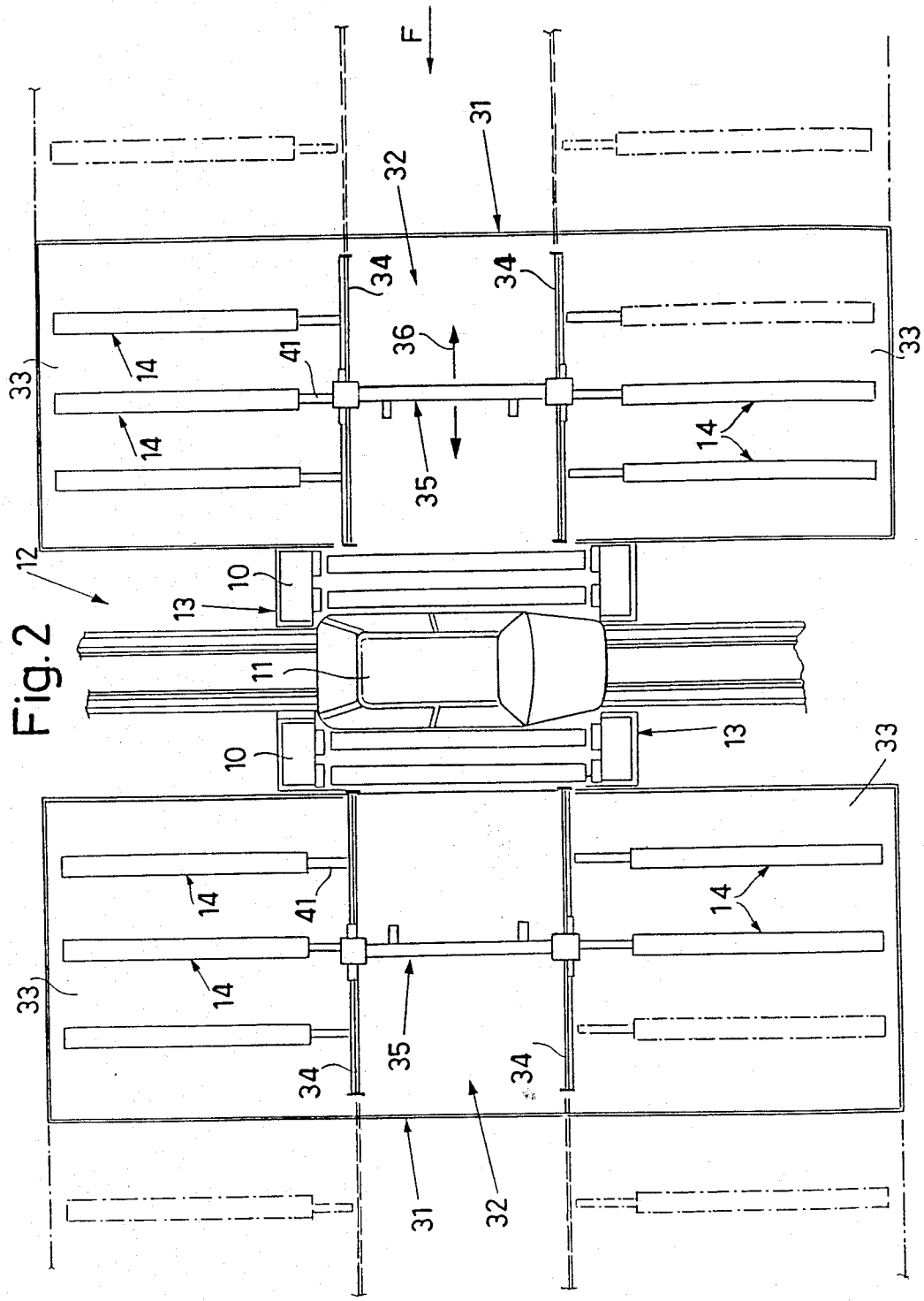
FIG. 2 is a plan view of the system of FIG. 1.
Figure 3:
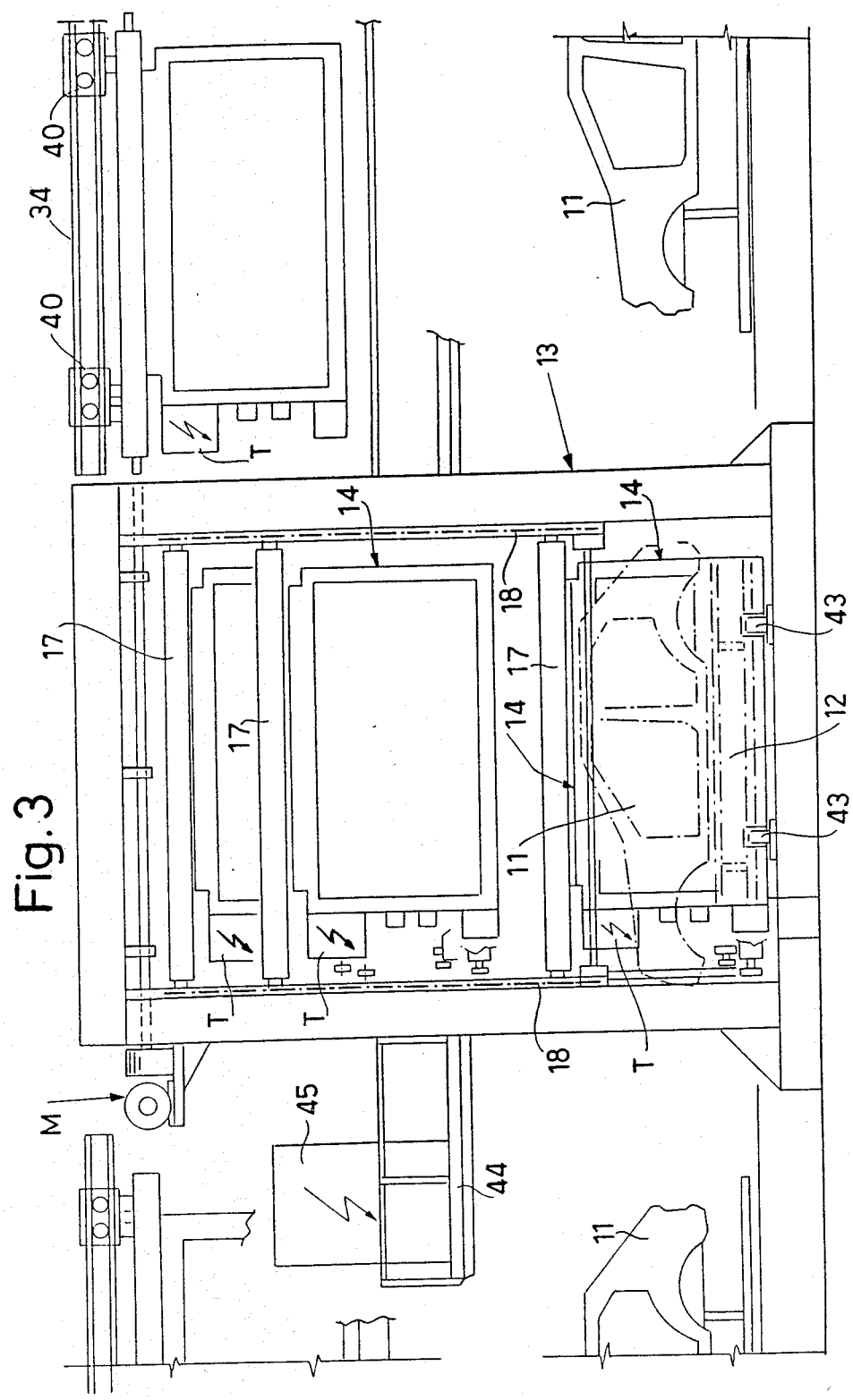
FIG. 3 is a longitudinal view of the system taken in the direction of arrow F of FIG. 2.
Figure 4:
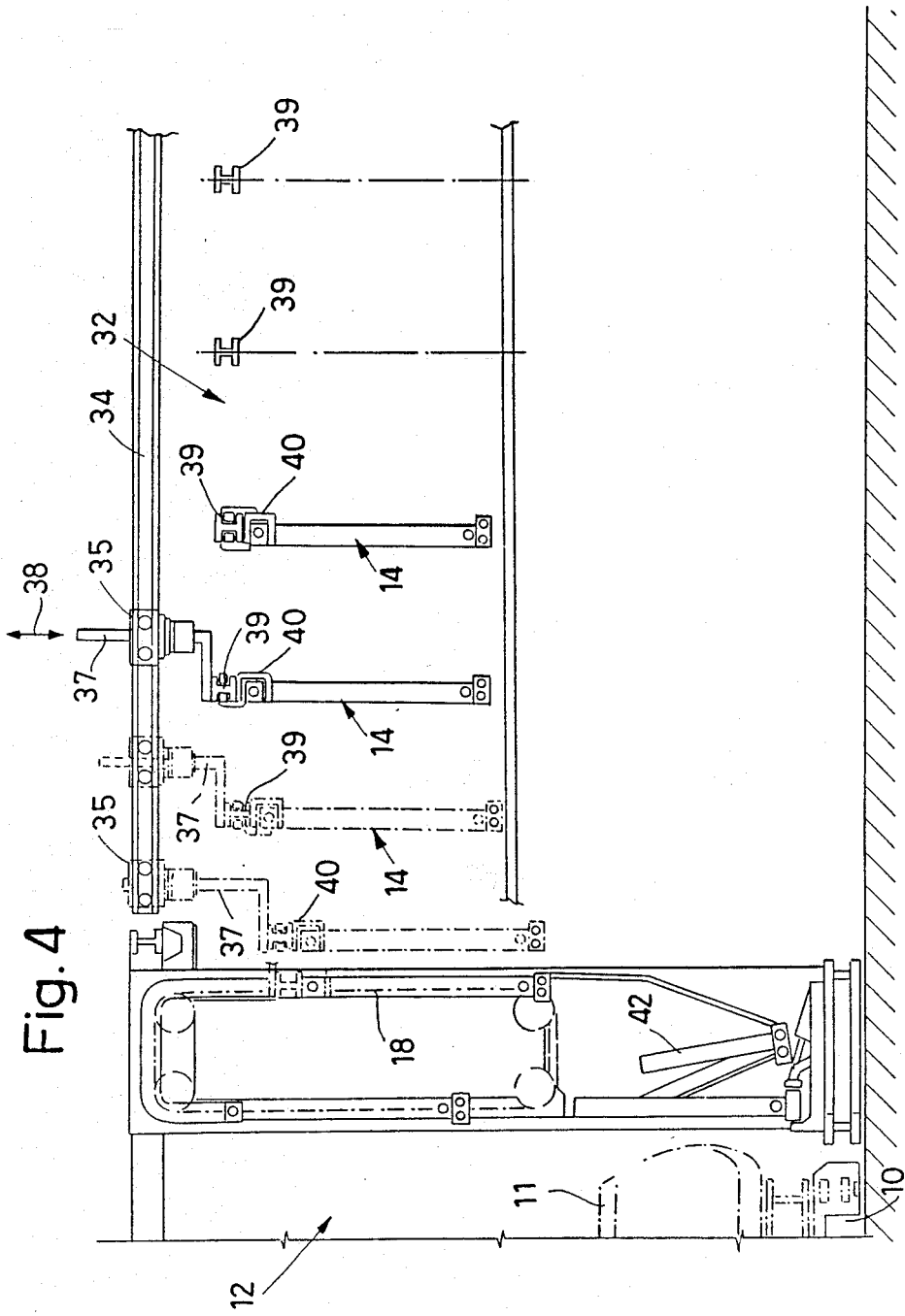
FIG. 4 is an enlarged view of a portion of the system as shown in FIG. 1 illustrating various handling stages of the forming-welding assemblies as made possible by the shifting and hoisting means of an additional overhead store.

With reference first to FIGS. 1-3 of the drawings, the system according to the invention is comprised of an on-floor line 10 for shifting and alternating the car bodies 11 with respect to a single working station 12. The line 10 is not herein illustrated in detail since it can be, for example, of the type disclosed in Italian patent application No. 67632 A/81.

The system according to the present invention is located sidewise or laterally of the line 10 and in correspondence with the working station 12. The system according to the invention includes a pair of opposed frames 13 each of which carries a plurality of forming-welding assemblies generally designated by the reference numeral 14.

Each of said assemblies 14 is comprised (FIG. 6) of a rectangular frame 15 mounted on a centering device generally designated by the reference numeral 16, said centering device 16 being used for positioning one assembly 14, in turn, in the correct working position relatively to the car body. the centering device 16 is not further described herein because it may be of the type disclosed in Italian patent application No. 22376 A/83 and 22377 A/83.

The centering device 16 carries the assembly 14 in such a way as to allow the assembly 14 to swing about an axis 17 fixed at opposite ends to links of chains 18 of a conveyor of the so called "paternoster" endless type, mounted on each of the frames 13 and actuated by a motor M. In this way the assemblies 14 can be moved within the respective frame 13 while maintaining, at any time, a mutual parallel relationship. It should be noted that a "paternoster" type endless conveyor is characterized as an elevator for persons or goods having a platform of shelves rising and falling on an endless chain.

Figure 5:
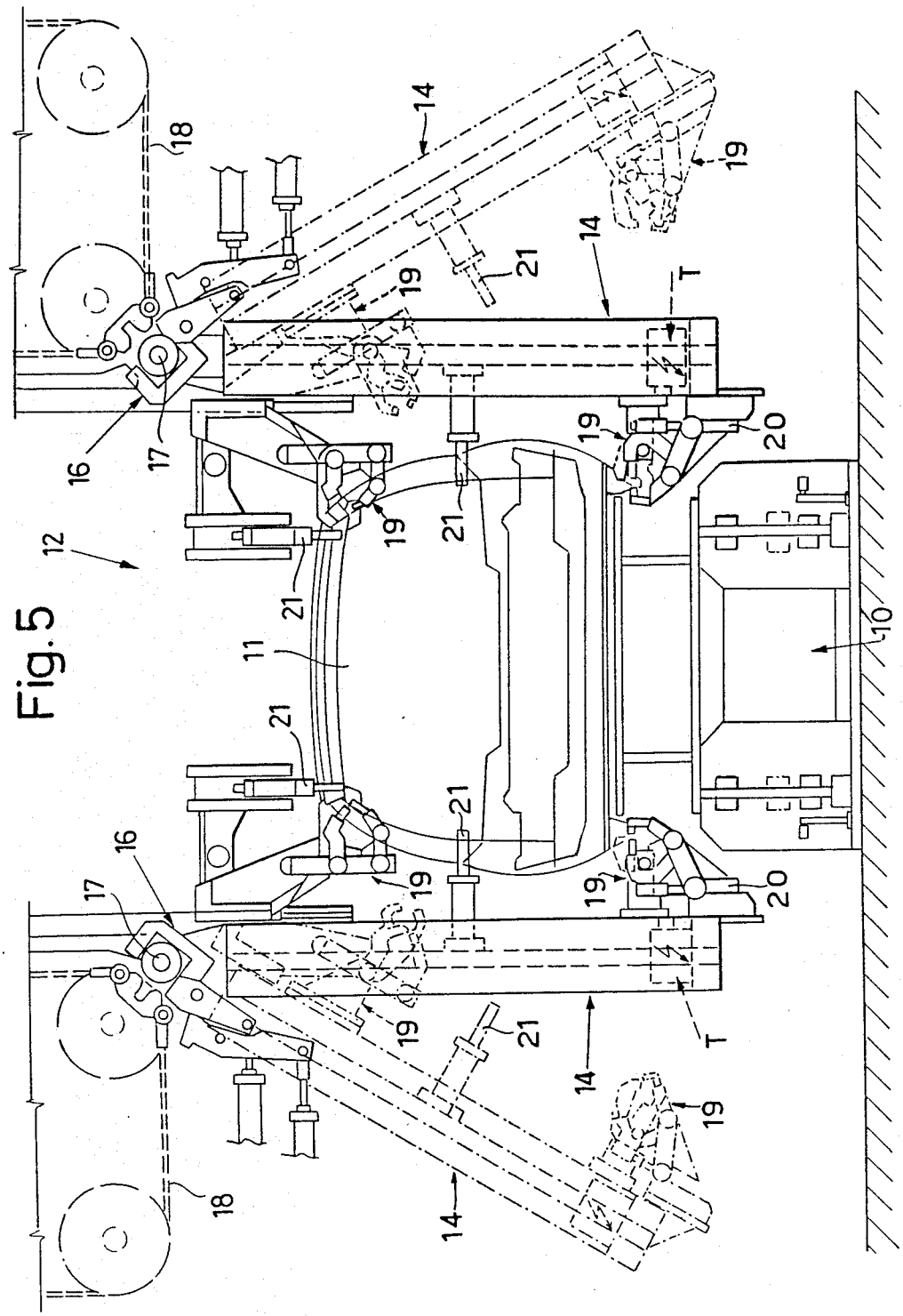
FIG. 5 is an enlarged transverse cross-section view showing, in detail, the working station and illustrating in the system the structure of the forming-welding assemblies together with their fixture.
Figure 6:
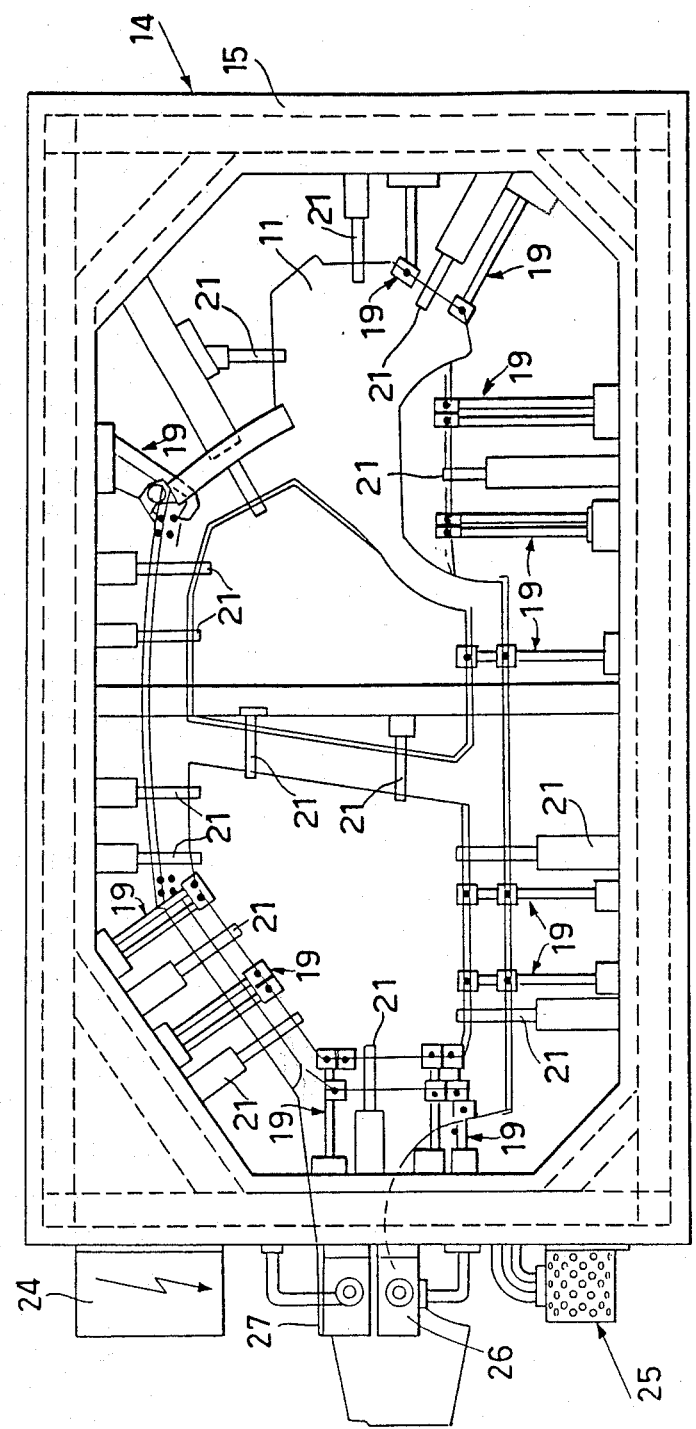
FIG. 6 is an enlarged front view showing a forming-welding assembly during operation including electrical supply means alongside said assembly means, and showing also the electrical equipment of the forming-welding assembly.

As schematically illustrated in FIGS. 5 and 6, each assembly 14 is provided with welding yokes 19, operating actuators 20, locking devices 21 and electric transformers T cooperate with said welding yokes 19.

Figure 7:
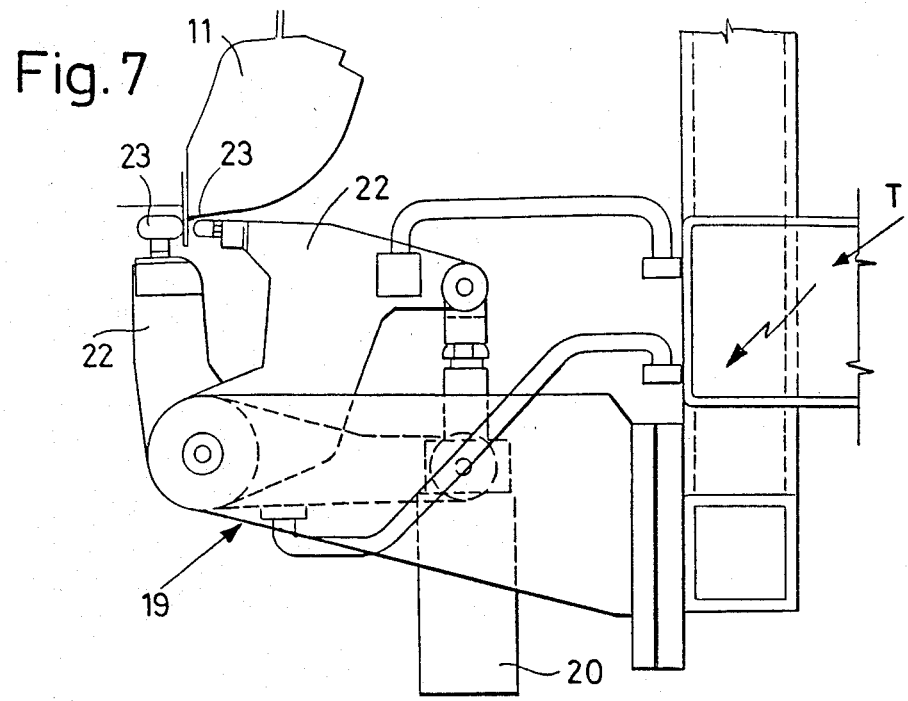
FIG. 7 and FIG. 8 are enlarged views of a detail of a welding yoke and the positioning of said yoke on a forming-welding assembly.
Figure 8:
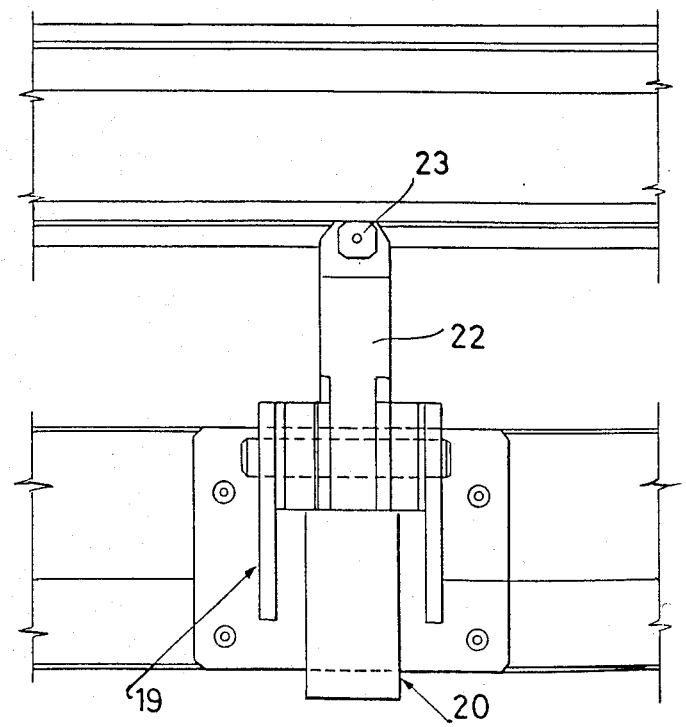
Figure 9:
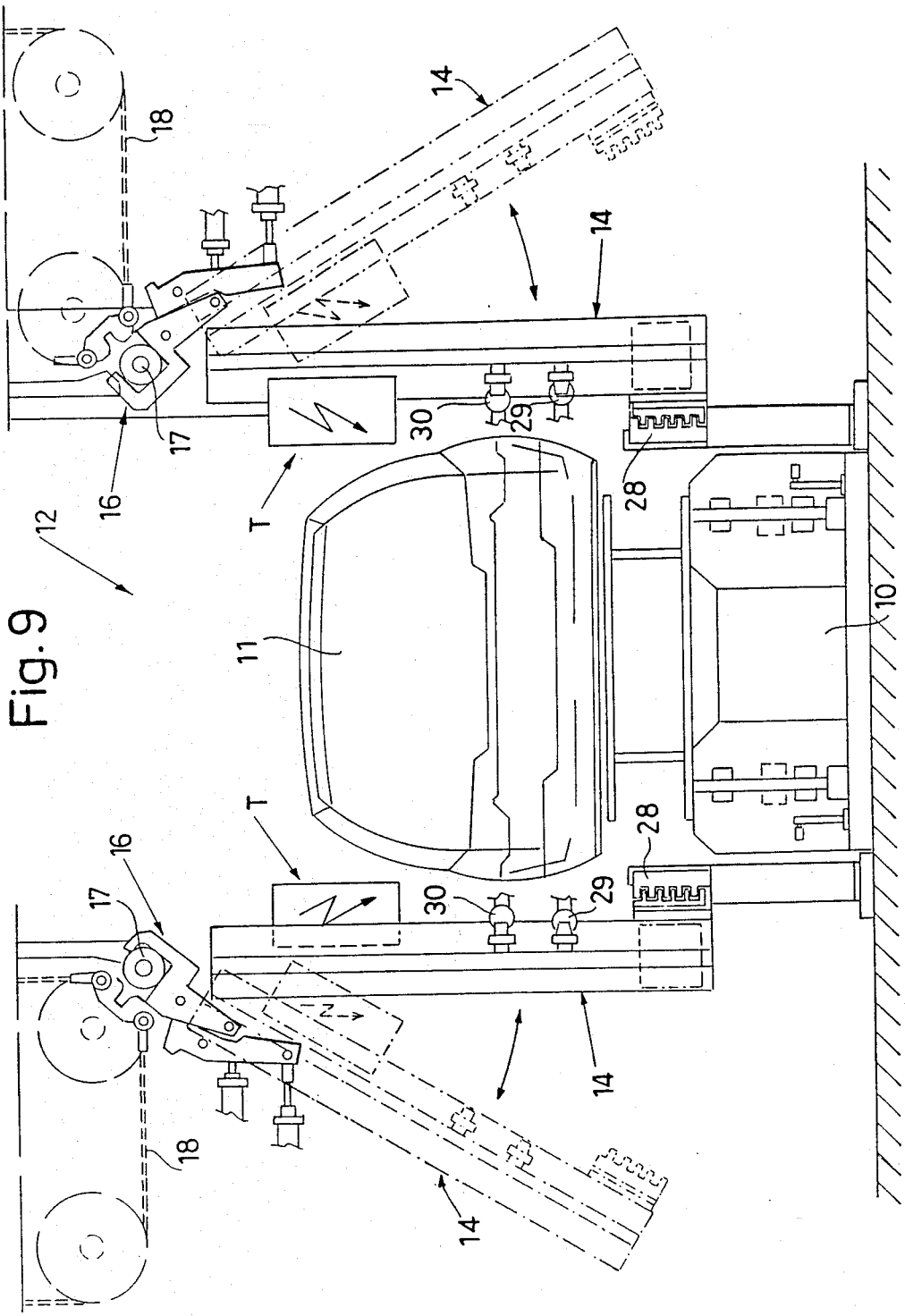
FIG. 9 shows in transverse schematic view the coupling between the on-floor portion and the on-board portion of the forming-welding assembly of the connection devices for the energy supply.

FIGS. 7 and 8 show, in more detail, a welding yoke 19 with its articulated arms 22 carrying electrodes 23 at the respective ends. The assembly 14, according to the invention, also carries an electrical board 24 (FIG. 6), an electrical connector assembly 25, an air intake 26 and a supply plug 27 for feeding a coolant. It is possible to automatically connect all of the intakes 25, 26 and 27 to corresponding stationary sockets 28, 29 and 30, respectively, provided on-floor, the coupling being effected when the respective assemblies 14 arrive at the working position shown in FIG. 9.

In addition, according to the present invention, alongside the pair of frames 13 carrying the above described forming-welding assemblies 14, there are provided overhead stores 31 suitable for supplying the desired assemblies 14, according to the type of car body supplied to the working station 12. Each of said stores 31 (FIG. 2) includes a central overhead bridge carriage 32 suitable for drawing an assembly 14, one at a time, from adjacent reservoirs 33.

More precisely, said bridge carriage 32 is comprised of a pair of rails 34, and a carrier 35 controllable for shifting in the direction of arrow 36 along the rails 34. By means of brackets 37 vertically movable in the directions of arrow 38, a rail 39 is suspended from the carrier 35, and power driven carriages 40 supporting the assemblies 14 can shift along the rail 39. The assemblies 14, through said carriages 40, are suspended from rails 41 of the juxtaposed reservoirs 33. In order to effect the passage of said carriages 40 from the central bridge carriage 32 to the juxtaposed reservoirs 33 and vice versa, said rails 39 and 41 are brought into mutually alignment.

In FIG. 1, a pair of rocking devices is schematically illustrated and designated by the reference numeral 42. The purpose of said rocking devices 42 is to place a pair of opposed assemblies 14 in the correct working position relatively to the car body 11. Said rocking devices 42 are not described here in detail, since they can be of a type disclosed in Italian patent application No. 22377 A/83.

The assemblies 14 are securely fixed on-floor in the correct working position by means of locking devices schematically illustrated in FIG. 3 and designated by the reference numeral 43.

The system of the invention is further provided with lofts 44 supporting containers 45 for electrical equipment which operate in connection with the above described devices.

The operation of the system according to the invention can be clearly understood from the above description thereof in connection with the drawings, and is briefly as follows.

According to the type of body which is to be processed, a preselected pair of opposed forming-welding assemblies 14 is supplied adjacent the working station 12 at the same time and with synchronous movements. Said assemblies 14 are firstly transferred from the lateral reservoirs 33 through carriages 40 on the rail 39 of the corresponding bridge carriage 32. The bridge carriages 32 carry said assemblies 14 into the suitable positions corresponding to the respective conveying chains 18, said assemblies being picked-up by the centering devices 16 and transferred to the floor adjacent the working station 12. After the arrival on-floor and adjacent the working station 12, the assemblies 14 are correctly positioned and securely fixed in the correct working position by means of the devices 42 and 43.

The characteristics of the system according to the invention can be summarized as follows.

First of all, the system advantageously provides on both sides of the assembly station a plurality of devices suitable for holding, positioning and vertically stacking the forming-welding assemblies, said assemblies being equipped with electric power devices such as welding yoke transformers, control equipment for the welding yokes, control equipments for the correct locking in position, control equipments for obtaining the optimum sequence of the tack-welding spots, coolant fluidic circuits and further circuits if required by the particular body to be assembled.

It is also of importance the fact that each forming-welding assembly is connected to the power supply on-floor system only in correspondence to the working station, so that the necessary energy sources are transferred on-board the forming-welding assemblies without use of any conventional external supply means having supply manifolds, rotary distributors, and flat cables.

In addition, the provision of at least one auxiliary store coupled to each system, which includes a plurality of forming-welding assemblies, placed overhead the production areas and suitable for receiving and exchanging said forming-welding assemblies of said systems, eliminates any limit to the production range and any hindrance to the production capabilities of the system.

Finally, the fact that each auxiliary store is placed at an elevation higher than that of the forming-welding assemblies to be picked-up and substituted and is connected to said assemblies by suitable shifting and hoisting means, minimizes the side volumes occupied.

The system according to the invention provides an improvement in the art of bodywork and sheet metal working in general, because:

(1) it assures the product quality;

(2) it assures production flexibility enabling different types of car bodies to be assembled making use of one and the same system;

(3) it assures a production speed approximately double that hitherto possible with the most advanced known systems;

(4) it has no problems regarding on-floor occupied space and encumbrance;

(5) it permits relatively low production costs, taking into account all the above advantages;

(6) it however does not require costly and cumbersome robots, but instead makes use of automatically operated welding yokes.

In this connection, it is to be considered that robots, since they are moving from point to point, must describe a trajectory in space, which necessarily takes working and measuring times which form an important portion of the operation cycle; use of robots would be inappropriate herein since they could be exploitable in fact only in approaching the car body.

With reference to FIGS. 10 to 16, a further possible embodiment of a system according to the invention will now be described as an example, wherein parts like or equivalent to those already described in connection with FIGS. 1-9 will be assigned like reference numeral increased by 100.

Figure 10:
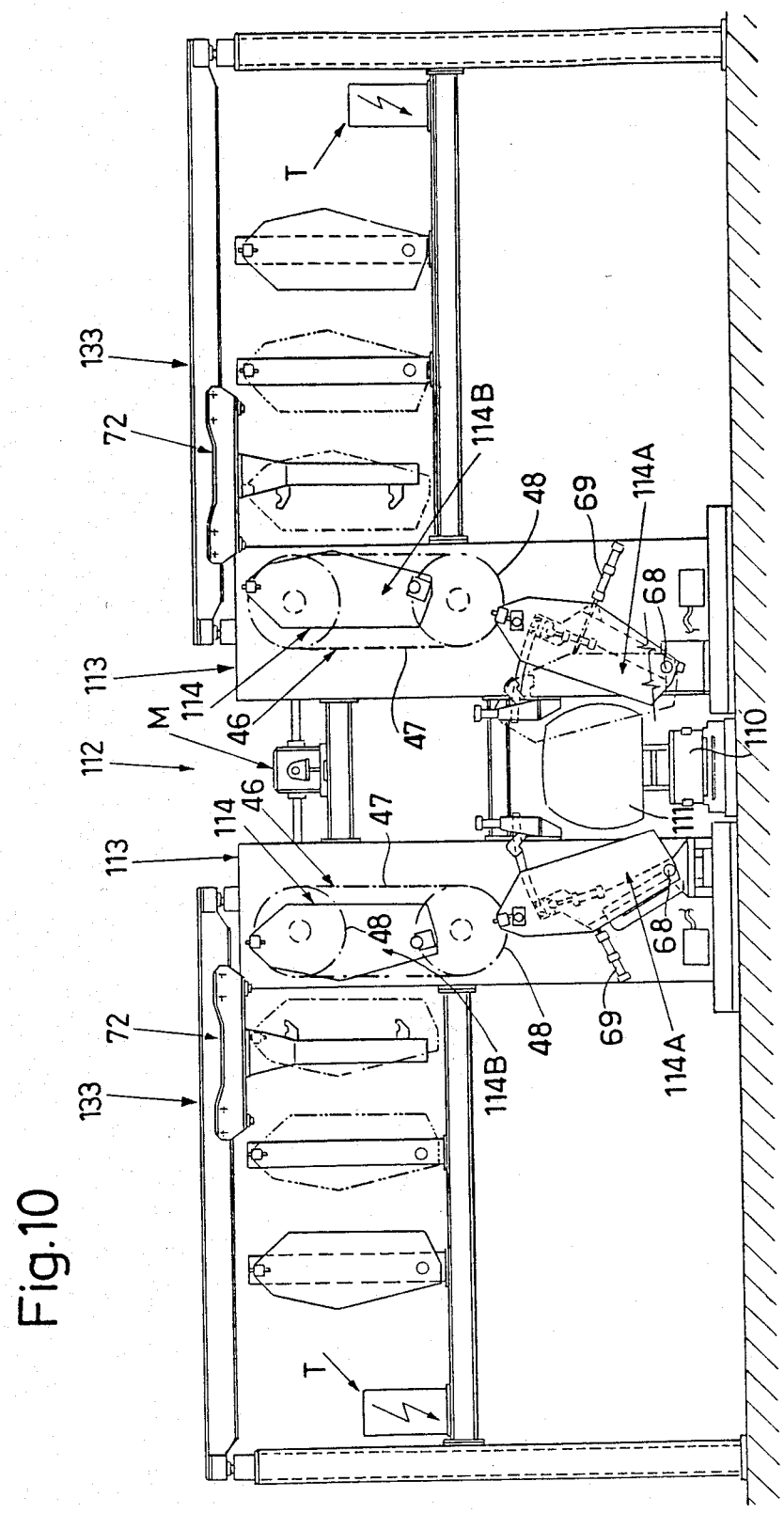
FIG. 10 is a transverse cross-section of another system according to the invention in correspondence with the single working station provided.

This further embodiment is different from the above described embodiment mainly in the handling means for the forming-welding assemblies 114. In fact, instead of conveyors 18 of the "paternoster" type previously described, each frame 113 includes a conveyor 46 comprised of a pair of opposed chains 47, each chain being arranged in a closed loop around only two end wheels 48 having a large diameter (FIGS. 10 and 11).

Figure 15:
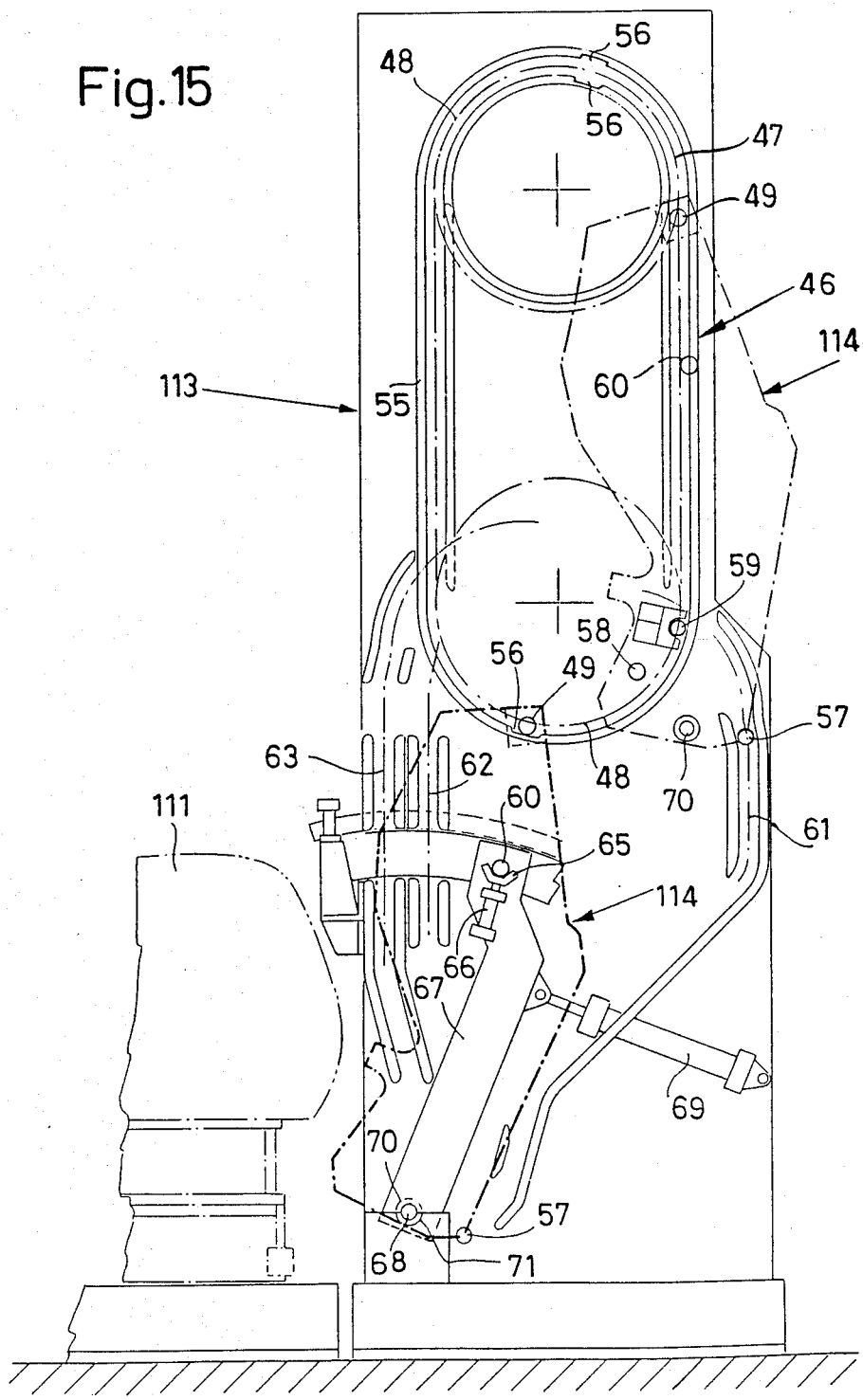
Figure 16:
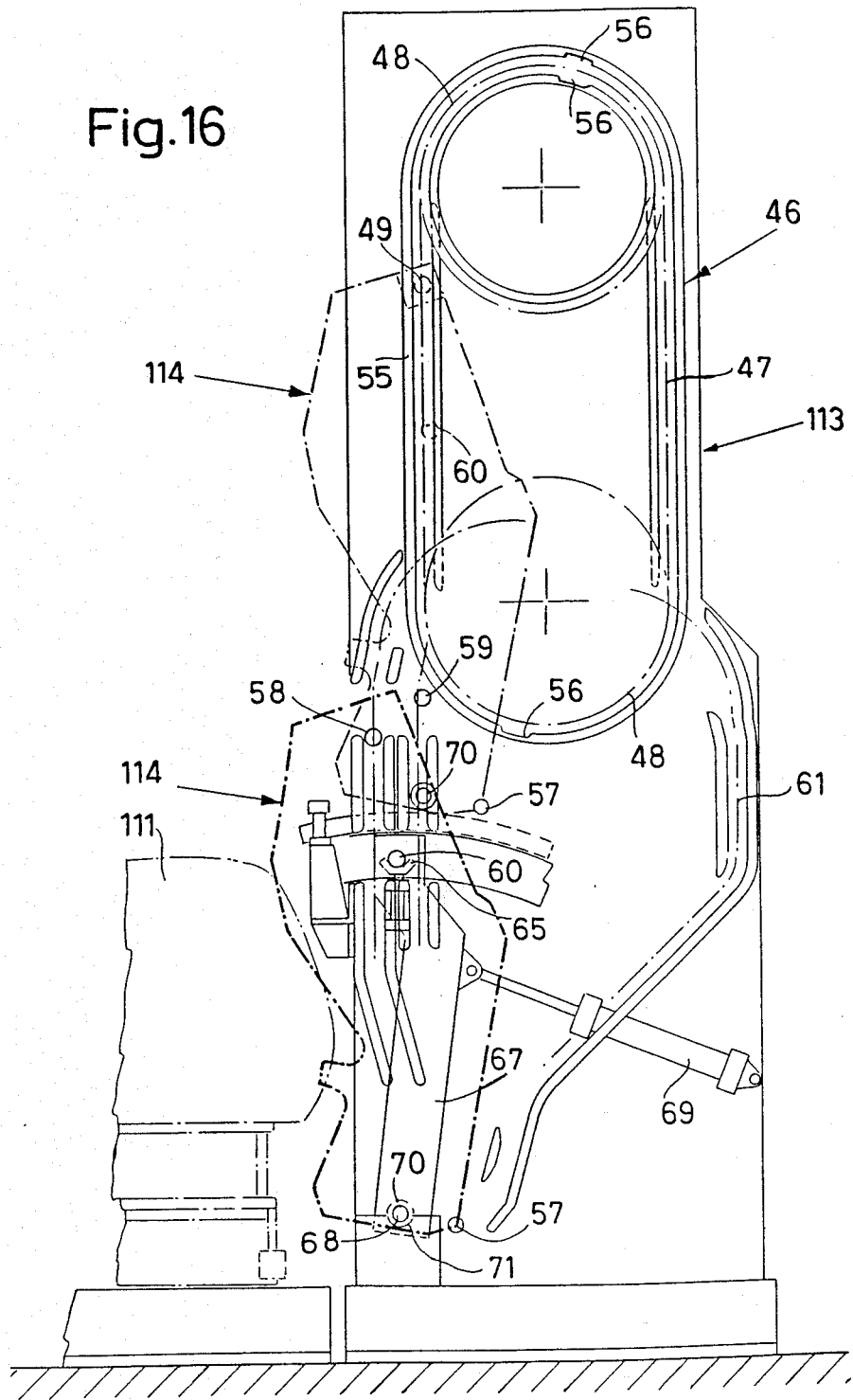

Each assembly 114 is linked to the opposed chains 47 by means of a pair of lateral retractable pins 49, correspondent actuators 50 (FIG. 12) being associated to said pins 49. As is clearly shown in the drawings, each pin 49 is loosely fitted in a hole 51 of a link 52 of the chain 47 so as to engage, by means of an undercut portion 53, the edges of a slit 54 provided on a wall of a box-like guide element 55 fastened to the vertical posts of frame 113. The disengagement of pins 49 from the guide elements 55 can be effected in two diametrically opposed places, upwardly respectively, for reasons explained in the following, through shaped apertures 56 provided to this end on the edges of slit 54 (FIGS. 14-16).

Figure 13:
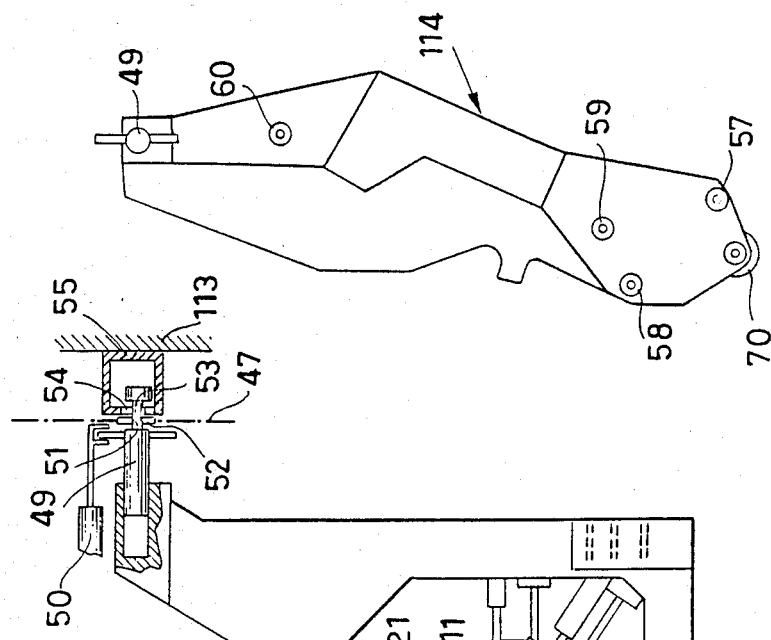
FIG. 12 and FIG. 13 show enlarged details of a forming-welding assembly, FIG. 12 showing the assembly as engaged with the guide of the frame and with the chains of the conveyor.
Figure 12:
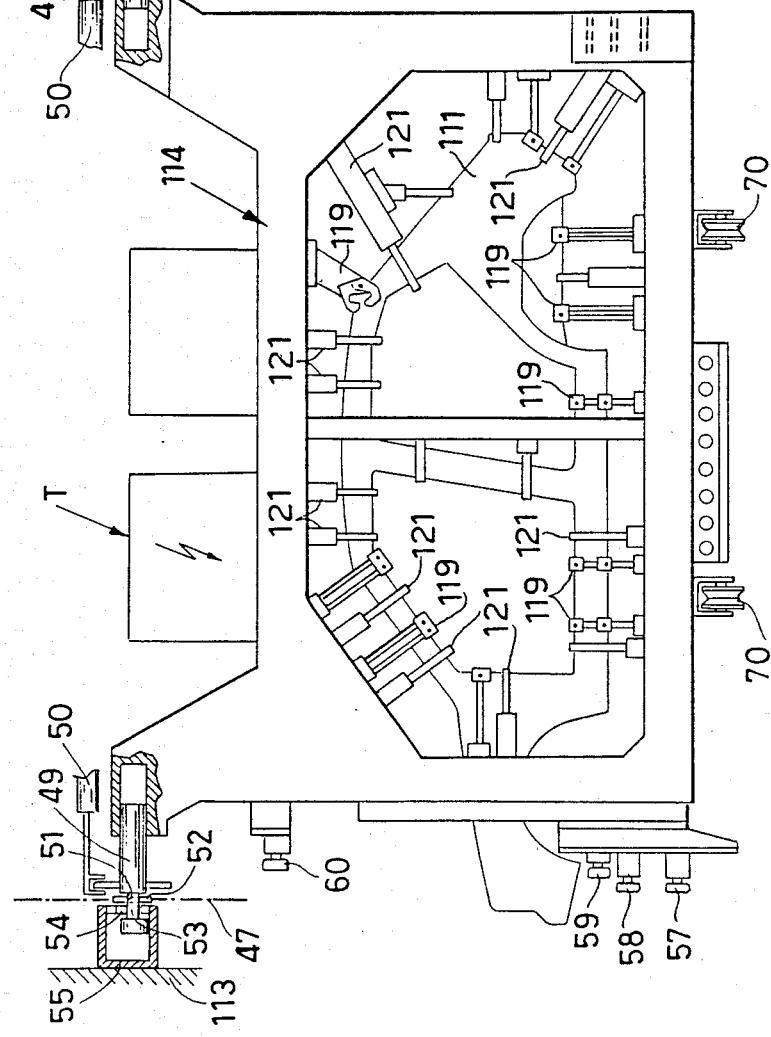

In order to guide, as desired, the downward and upward movements of the assemblies 114 inside frame 113, each assembly 114 is provided, on at least one side, with a plurality of mechanical sensors, for example rollers 57, 58, 59 and 60 (FIGS. 12 and 13).

Rollers 57, 58 and 59 engage guide cams 61, 62 and 63, respectively, provided on the corresponding vertical post of frame 113, while roller 59 also engages a bracket 64 integral with the bottom wheel 48, in order to help the transfer of the assembly 114 from a vertical branch to the other of the conveyor 46. Roller 60 is instead provided for engagement with a fork 65 mounted on the top portion of an actuator 66 fixed near the upper free end of an oscillating arm 67 which on the other end is pivotally fixed at 68 to the vertical post of frame 113. Said arm 67 is actuated be means of an actuator 69 operating between arm 67 and frame 113.

Each forming-welding assembly 114 is further provided on the bottom side with a pair of rollers 70 (FIG. 12) suitable for engagement with corresponding cradles 71 on the base portion of the frame.

Similarly to the embodiment described above, the working station 112 cooperates with stores 133 for collecting the forming-welding assemblies 114, said stores 133 being provided with a number of places which is a function of the production requirements. Said stores 133 will also include handling means suitable for drawing each assembly 114 into engagement with the conveyor 46. Said handling means are schematically designated by the reference numeral 72 and are not further described in detail since they can be of a known type, with power-driven carriages and actuators, as described above with reference to FIGS. 1-10.

In FIGS. 14-16 there is clearly shown the manner in which an assembly 114 arriving from a store 133 and upwardly engaged with conveyor 46 in the position shown in FIG. 14 and is moved to the operating position shown in FIG. 16.

By rotating the conveyor 46 clockwise with continuous movement, the assembly 114 descends to the position depicted with dotted lines in FIG. 15, and in this position, the sensor 57 fits into guide 61 to carry said assembly 114 to the position depicted with dot-and-dash lines in FIG. 15. In this position roller 60 is engaged with fork 65 of oscillating arm 67, and rollers 70 are engaged with cradles 71.

From the position depicted with dot-and-dash lines in FIG. 15, the assembly 114 is caused to rock by means of actuator 69 to the working position depicted by dot lines in FIG. 16, after disengagement of the retractable pins 49 from the guides 55 and chains 47 of conveyor 46.

Upon completion of its operating cycle, each assembly 114 is returned to the position depicted by dot-and-dash lines in FIG. 15, the assembly 114 being again engaged with chains 47 of conveyor 46 by means of pins 49; conveyor 46 by its clockwise rotary movement carries said assembly in the start position illustrated in FIG. 14. To this end, the assembly 114 is guided during its upward movement with the aid of the engagement between rollers 58, 59 and guides 62, 63. From this position, the assemblies 114 can be picked up by means of the handling means 72 and stored.

The above embodiment allows the control of the relative positions between the power forming machines without having recourse to mechanical interlocking devices, which are always of some complexity to the detriment of the reliability of the system and without recourse to guides to drive the downward part of the power forming machine during the transfer. By this new improvement, during the transfer, the two power forming machines will stay parallel to one another at the foreseen distance and acting each as a vertically placed connecting rod. The inlet, the outlet, the sensor movements in the respective guides and brackets take place by a mere geometric factor without intervention of any mechanism and all according to the movement of the chains of conveyor 46.

The realization of such a solution is enabled by the particular geometric arrangement, where there has been restricted to two—as seen—the number of the forming-welding assemblies engaged with each conveyor and each power forming machine has been given a height superior to the center distance between the wheels 48. Furthermore the diameter of each of the two wheels 48 must be bigger than the transverse dimension of the assembly 114 compared with the conveying axis.

The embodiment shows a power forming machine 114 which one placed in the working area, approaches and couples with the car body pivoting around an axis 70, 71 placed in the downward part.

It is to be noted that in comparison with the car body side, the more distant points of the welding and clamping points towards the vertical axis of the power forming machine 114 are those concerning the roof, whereby the respective fixtures would have longer, more complex and more articulated arms that those corresponding to the flat zone.

A higher complexity and number of articulated joints give rise to bigger dimensions and higher weights.

The oscillation axis of the power forming machine was thus foreseen in the downward part; the upper part can thus enjoy the utmost possible spreading apart towards the car body, as desired.

The downward hinging axis allows on the other side a wide working margin when choosing the right position as not conditioned by release and supporting device of the power forming machine, for which reason it allows a rationalization of the power forming machine 114 shape and of the car equipments.

It is to be noted that there has been foreseen—as another embodiment—that the approach movement of the power forming machine to the car body can also take place by horizontal traverse instead of by oscillation.

The alternation of the assemblies 114 in the working station 112 takes place during the time interval corresponding to a production cycle or during the alternation of car bodies on the floor. It is to be noted (FIG. 10) that while an assembly is in the downward working position (FIG. 16), another one is waiting in an upward position (FIG. 14).

The alternation of the assemblies 114 between the working station 112 and the store takes place in a manner which avoids interference with the car body working cycle during all the working time; simply the alternation is preset with a minimum time advance on the time in which the model is required at the working place.

The sequence of the operation stages of the above described system can be summarized therefore as follows:

1. The welding cycle is effected with one type of forming device 14A (FIG. 1);

2. In sequence, the welding yoke 119 is opened; the locking devices 121 of the car body are opened on board of the waiting forming device 114B; the locking devices of the forming device 114A in working position are loosened, and the forming device leaves the car body going to the waiting position (in fact there are two waiting positions: the first one is sufficient for allowing the replacement of the car body and the second has to travel a little bit longer so as to allow the locking of the pins 49 to the chain 47);

3. At this point the replacement of the car body is already running its course;

4. If now there is in programm a replacement of the car body type, the electrical connections are disconnected, the pins 49 are fitted into the links of the chains 47, the fork 65 of the arm 67 is withdrawn, and the alternation handling through chains 46 is started, as previously described.

5. The forming device 114A picked up by chains 47 performs an upward motion, while the bottom part of said device, by means of sensors 58, 59, is engaged with the guides 62, 63 which are suitably shaped and positioned so as to cause the forming device 114A to engage automatically during its upward motion with the bottom wheel 48 so as to give rise to a shifting displacement through parallel planes, like a connecting rod.

6. At the moment in which the forming device 114A reaches the upward position formerly occupied by the forming device 114B, the latter is in the downward position defined as waiting position and meanwhile the new car body is arriving, on the forming device 114B there are in course the following operations: fitting the fork 65 of arm 67 on sensor 60; withdrawing of pins 49; connection of power supplies; approaching of forming device 114B to the new car body and locking of said device in working position, and locking of locking device of the car body. When the system is ready, the welding cycle is performed.

I claim:

1. An automatic system for the production of sheet metal bodies, comprising:
   means defining a single body-processing station for receiving a plurality of bodies to be welded;
   a pair of stores vertically elevated above and positioned on opposing sides of said single body-processing station;
   a plurality of forming-welding assemblies contained in said stores, said forming-welding assemblies having welding and auxiliary equipment including as many welding machines as there are welds to be made on one of said bodies, whereby a plurality of welds may be performed on each of said bodies simultaneously;
   conveying means for moving said forming-welding assemblies around in said stores and for raising and lowering respective pairs of said forming-welding assemblies between said pair of stores and said single body-processing station;
   positioning means, provided at said single body-processing station, for positioning each pair of said forming-welding assemblies in a proper operative position alongside one of said bodies to be produced at said single body-processing station; and means for providing electrical, hydraulic and pneumatic connections to said forming-welding assemblies for operating said welding and auxiliary equipment thereon when said forming-welding assemblies are respectively at said operative position.

2. An automatic system according to claim 1, wherein said conveying means are mounted on a pair of supporting frames placed between said stores and said single body processing station, said conveying means being comprised of chain conveyors, said forming-welding assemblies being connected to said chain conveyors through connecting means in an articulated and separable manner.

3. An automatic system according to claim 2, further comprising guiding means which cooperate with said chain conveyors, said guiding means operating between said supporting frames and said forming-welding assemblies.

4. An automatic system according to claim 3, wherein said guiding means are comprised of a plurality of sensors provided on at least one side of each forming-welding assembly, said sensors cooperating with cam guides provided on an opposed part of said supporting frames.

5. An automatic system according to claim 2, wherein said connecting means are comprised of two retractable pins provided alongside each of said assemblies, said pins being linked by passing through the links of said chains of said conveying means and being shiftable within guides of said supporting frames.

6. An automatic system according to claim 1, wherein said positioning means are comprised of a rocking arm which is releasably engaged with each of said assemblies, each of said assemblies resting with its bottom side on articulation cradles provided alongside said working station.

7. An automatic system according to claim 1, wherein said conveying means comprise an endless chain type conveyor.

8. An automatic system according to claim 1, wherein said conveying means comprises an endless chain and two end wheels of large diameter about which said chain is looped.

* * * * *